US008252159B2

(12) United States Patent
Roux et al.

(10) Patent No.: US 8,252,159 B2
(45) Date of Patent: Aug. 28, 2012

(54) MICROFLUIDIC DEVICE FOR CONTROLLED MOVEMENT OF LIQUID

(75) Inventors: Jean-Maxime Roux, Grenoble (FR); Raymond Campagnolo, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 387 days.

(21) Appl. No.: 12/497,853

(22) Filed: Jul. 6, 2009

(65) Prior Publication Data

US 2010/0000866 A1 Jan. 7, 2010

(30) Foreign Application Priority Data

Jul. 7, 2008 (FR) .................................... 08 54597

(51) Int. Cl.
*G01N 27/453* (2006.01)

(52) U.S. Cl. ...................................................... 204/450

(58) Field of Classification Search .................. 204/450, 204/600

See application file for complete search history.

(56) References Cited

U.S. PATENT DOCUMENTS

| | | | | |
|---|---|---|---|---|
| 7,261,824 | B2 * | 8/2007 | Schlautmann et al. | 216/2 |
| 2002/0125138 | A1 | 9/2002 | Medoro | |
| 2003/0006140 | A1 | 1/2003 | Vacca et al. | |

FOREIGN PATENT DOCUMENTS

| | | | |
|---|---|---|---|
| WO | 2006098700 | A | 9/2006 |
| WO | 2008055256 | A | 5/2008 |

OTHER PUBLICATIONS

Ren et al., "Automated on-chip droplet dispensing with volume control by electro-wetting actuation and capacitance metering," Sensors and Actuators B 98 (2004) 319-327.*

Gong et al., "All-electronic droplet generation on-chip with real-time feedback control for EWOD digital microfluidics," Lab Chip, 2008 (online Apr. 21, 2008).*

Preliminary International Search Report for Appl. FA 710443 dated Apr. 17, 2009.

Mugele, F. and Baret, J.; "Electrowetting: from basics to applications", Journal of Physics Condensed Matter, 2005, pp. R705-R774, vol. 17, IOP Publishing Ltd., UK.

* cited by examiner

*Primary Examiner* — Alex Noguerola

(74) *Attorney, Agent, or Firm* — Pearne & Gordon LLP

(57) ABSTRACT

The invention concerns a microfluidic device for the controlled movement of liquid. The controlled-movement device according to the invention comprises a microchannel (10) filled with a first liquid ($F_1$) and a fluid ($F_2$) forming a first interface ($I_1$) with the first liquid ($F_1$), or forming a first interface ($I_1$) with the first liquid ($F_1$) and a second interface ($I_1$) with a second liquid ($F_3$) situated downstream of said fluid ($F_2$), and means of moving the first liquid ($F_1$) by electrowetting. A control system is provided for controlling the movement of the first liquid ($F_1$) according to the position of an interface ($I_1$, $1_3$) of the fluid ($F_2$).

13 Claims, 4 Drawing Sheets

MICROFLUIDIC DEVICE FOR CONTROLLED MOVEMENT OF LIQUID

TECHNICAL FIELD

The present invention relates to the general field of microfluidics and concerns a device for moving liquid in a microchannel.

PRIOR ART

Microfluidics is a technical field that has been expanding greatly for around ten years, because in particular of the design and development of chemical or biological analysis systems, referred to as lab-on-chip.

This is because microfluidics makes it possible to effectively manipulate small volumes of liquid. It is possible to carry out on one and the same medium all the steps of analysing a liquid sample in a relatively short time and using small volumes of sample and reagents.

The manipulation of small volumes of liquid may also require, depending on the application, moving a gas or liquid in a microchannel.

Thus the document US-A1-2006/0083473 describes a device for moving liquid in a microchannel, by electrowetting, or more precisely by electrowetting on dielectric.

The functioning is as follows, with reference to FIG. 1, which shows schematically the device according to the prior art in a longitudinal section.

The device comprises a microchannel A10 formed in a substrate (not shown) in which a conductive liquid slug $AF_1$ is situated, surrounded by a dielectric fluid $AF_2$ so as to form an upstream interface $AI_{1,R}$ and a downstream interface $AI_{1,A}$.

Liquid slug means a drop, contained in a channel or tube, that has a substantially greater length than the diameter. The terms upstream and downstream are defined with reference to the direction X parallel to the axis of the microchannel A10.

The triple line of the interfaces $AI_{1,R}$ and $AI_{1,A}$ is contained in a plane substantially transverse to the microchannel A10.

Two activation electrodes A31 are each disposed on a face of the microchannel A10 opposite each other. A dielectric layer A34 covers the electrodes A31 so as to electrically insulate these from the liquid $AF_1$. The downstream interface $AI_{1,A}$ is situated at the electrodes A31.

An electrode forming a counter-electrode A32 is disposed on a face of the microchannel upstream of the interface $AI_{1,A}$ and is in contact with the conductive liquid $AF_1$.

The electrodes A31 and A32 are connected to a DC voltage source A33.

When the voltage source A33 is activated, the dielectric layer A34 between the electrodes A31 and the liquid under tension $AF_1$ acts as a capacitor.

The electrostatic forces applied, referred to as electrowetting forces, allow the movement of the liquid $AF_1$.

The liquid $AF_1$ can then be moved in the direction X on the dielectric layer A34 by activation of the voltage source A33. The fluid $AF_2$ is then "pushed" by the liquid $AF_1$ in the same direction.

The liquid-movement device according to the prior art does however have the drawback of not allowing precise control of the movement of the liquid according to the position of the interface $AI_{1,A}$.

This is because, when the voltage source A33 is activated, the liquid $AF_1$ moves at constant speed until it entirely covers the dielectric layer A34 without its being possible to know the instantaneous position of the interface $AI_{1,A}$.

The device does not make it possible to stop the movement of the liquid $AF_1$ at a precise instant or for a given position of the interface $AI_{1,A}$ since the position of the interface is not known.

In addition, the device according to the prior art does not make it possible to increase or reduce the speed of movement of the liquid $AF_1$ according to the position of the interface $AI_{1,A}$.

DISCLOSURE OF THE INVENTION

The aim of the present invention is to remedy the aforementioned drawbacks and in particular to propose a device for the controlled movement of liquid for which the movement of the liquid can be controlled according to the position of a detected interface.

To do this, the subject matter of the invention is a device for the controlled movement of liquid comprising a substrate in which a microchannel is formed, said device comprising:

- a first electrically conductive liquid partially filling the microchannel in the longitudinal direction of the microchannel,
- a dielectric fluid located downstream of said first liquid in the longitudinal direction of the microchannel, forming a first interface with the first liquid, or forming a first interface with the first liquid and a second interface with a second liquid situated downstream of said fluid, and
- means of moving the first liquid by electrowetting.

According to the invention, the controlled-movement device comprises a capacitive measuring device for controlling the movement of the first liquid according to the capacitance measured.

Advantageously, the means of movement by electrowetting comprises:

- at least one control electrode disposed on at least part of the wall of the microchannel defining a control portion, and covered with a dielectric layer, said first interface being situated in said control portion,
- an electrically conductive means forming a control counter-electrode, in contact with the first liquid, and
- a first voltage generator for applying a potential difference between said electrode and said counter-electrode, said capacitive measuring device being connected to said first voltage generator in order to vary the potential difference applied according to the capacitance measured.

According to a first embodiment of the invention, the capacitive measuring device is adapted to determine the position of the first interface and comprises:

- said control electrode forming a detection electrode,
- said control counter-electrode forming a detection counter-electrode,
- a second voltage generator for applying a potential difference between said detection electrode and said detection counter-electrode,
- means of measuring the capacitance formed between said detection electrode and said detection counter-electrode.

According to a second embodiment of the invention, the capacitive measuring device is adapted to determine the position of the second interface and comprises:

- at least one detection electrode disposed on at least part of the wall of the microchannel defining a detection portion situated downstream of said control portion, said second interface being situated in said detection portion,
- an electrically conductive means forming a detection counter-electrode, in contact with the second liquid,

- a second voltage generator for applying a potential difference between said detection electrode and said detection counter-electrode,
- means of measuring the capacitance formed between said detection electrode and said detection counter-electrode.

The capacitive measuring device preferably comprises calculation means, connected to the measuring means, for determining the position of the interface according to the capacitance measured.

The capacitive measuring device preferably comprises control means, connected to the calculation means and to the first voltage generator, for controlling the potential difference applied by the latter.

According to a variant of the second embodiment, the second liquid being electrically conductive, a layer of dielectric material covers the detection electrode.

According to another variant of the second embodiment, the second liquid is dielectric, the permittivity of which is different from that of the fluid. In this case, it is preferable for the difference in permittivity between said second liquid and said fluid to be substantially greater than or equal to 50%.

Advantageously, the measuring means comprise a capacitor, referred to as the reference capacitor, connected in series with the detection electrode, and a voltmeter for measuring the voltage at the terminals of said reference capacitor.

Alternatively, the measuring means can comprise an impedance analyser.

In one embodiment of the invention, said detection electrode can comprise a plurality of elementary detection electrodes.

In this case, said substrate is advantageously taken to a potential determined by an electrically conductive means.

Preferably, said means taking the substrate to a given potential comprises an electrode disposed on an external face of the substrate and extending over the entire length of the detection electrode.

Other advantages and characteristics of the invention will emerge from the following non-limitative detailed description.

BRIEF DESCRIPTION OF THE DRAWINGS

Embodiments of the invention will now be described by way of non-limitative examples with reference to the accompanying drawings, in which.

DETAILED DISCLOSURE OF A PREFERRED EMBODIMENT

Figure 1:
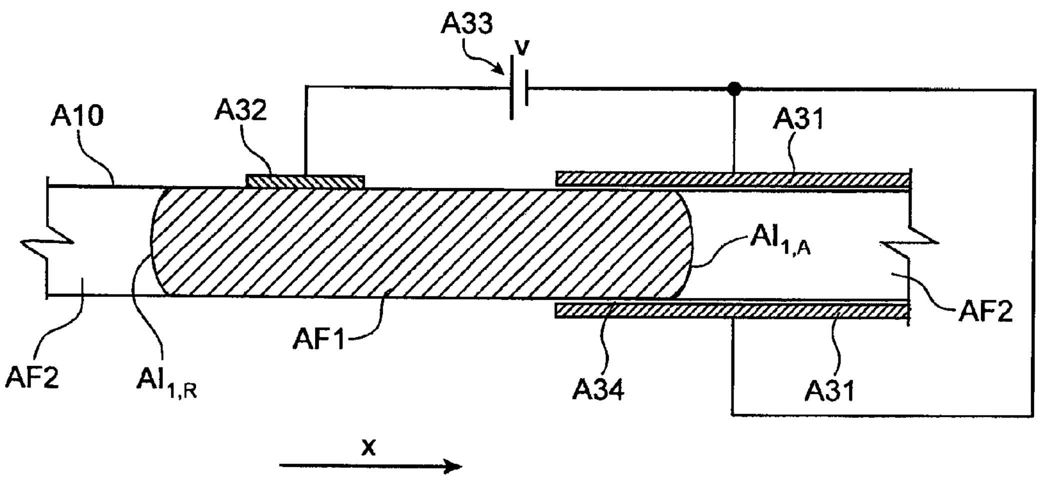
FIG.1 PRIOR ART
FIG. 1 is a schematic representation in longitudinal section of a liquid-movement device according to the prior art.
Figure 2:
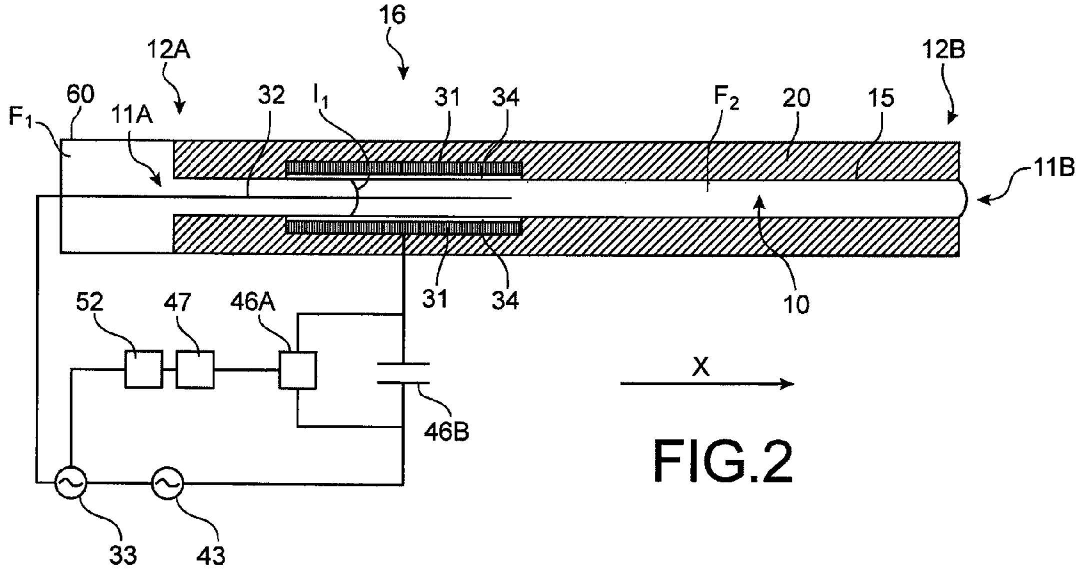
FIG. 2 is a schematic representation in longitudinal section of a device for the controlled movement of liquid according to a first embodiment of the invention, for which the detected interface corresponds to that subjected to the electrowetting forces.

FIG. 2 depicts schematically in longitudinal section a microfluidic device for the controlled movement of liquid according to a first embodiment of the invention.

The device comprises a microchannel 10 formed in a substrate 20. The microchannel 10 can comprise a first end 12A comprising a first opening 11A and a second end 12B opposite to the first end 12A in the longitudinal direction of the microchannel 10 and comprising a second opening 11B.

The microchannel 10 can have a convex polygonal transverse section, for example square, rectangular or hexagonal. It is considered here that a square section is a particular case of the more general rectangular shape. It may also have a circular transverse section.

The term microchannel is taken in a general sense and comprises in particular the particular case of the microtube whose cross section is circular.

Throughout the following description, the terms height and length designate the size of the microchannel 10 or of a portion of the microchannel 10 in the transverse and longitudinal directions respectively. Thus, for a microchannel with a rectangular cross section, the height corresponds to the distance between the bottom and top walls of the microchannel, and for a microchannel with a circular cross section the height designates the diameter thereof.

In addition, it should be noted that the verbs "cover", "be situated on" and "be disposed on" do not necessarily imply direct contact here. Thus a material may be disposed on a wall without there being direct contact between the material and the wall. Likewise, a liquid may cover a wall without there being direct contact. In these two examples, an intermediate material may be present. Direct contact is assured when the qualification "directly" is used with the previously mentioned verbs.

A first liquid $F_1$ partially fills the microchannel 10, for example from the first end 12A.

A reservoir 60 containing the liquid $F_1$ can be connected to the microchannel 10 by means of the opening 11A of the end 12A and is intended to supply the microchannel 10 with piston liquid $F_1$.

A dielectric fluid $F_2$ fills the microchannel 10 downstream of the first liquid $F_1$ and forms with the latter an interface $I_1$.

The triple line of the interface $I_1$ is contained in a plane substantially transverse to the microchannel 10.

The piston liquid $F_1$ is electrically conductive and may be an aqueous solution charged with ions, or mercury.

The fluid $F_2$ is electrically insulating. It may be a gas, for example air, or a liquid such as an alkane, for example hexadecane, or a silicone oil. In general terms, the dynamic viscosity of the fluid $F_2$ is preferably low, for example between 5 cp and 10 cp approximately.

The first liquid $F_1$ and the fluid $F_2$ are non-miscible.

An activation electrode 31 is disposed directly on at least one face of the internal wall 15 of the substrate 20 and extends in the longitudinal direction of the microchannel 10. It is said to be buried because it is isolated from any contact by the liquid $F_1$ by a thin dielectric layer 34, and extends over part or all of the surface of the contour of the microchannel 10.

A counter-electrode 32 is disposed in the microchannel 10 in the form of a catenary, that is to say an electrically conductive wire, for example made from Au. This electrode may also be a planar electrode or wire disposed on a face of the microchannel 10 (the latter case is described below).

The counter-electrode 32 preferably extends in the microchannel 10 opposite the electrode 31. It may however be in contact with the liquid $F_1$ upstream of the electrode 31, for example at the reservoir 60.

A voltage source 33, preferably alternating, is connected to the electrode 31 and to the counter-electrode 32.

When the biasing voltage is alternating, the liquid behaves as a conductor when the frequency of the biasing voltage is substantially less than a cutoff frequency, the latter, depending in particular on the electrical conductivity of the liquid, is typically around a few tens of kilohertz (see for example the article by Mugele and Baret entitled "Electrowetting: from basics to applications", J. Phys. Condens. Matter, 17 (2005), R705-R774). In addition, the frequency is substantially higher than the frequency making it possible to exceed the hydrodynamic response time of the liquid $F_1$, which depends on the physical parameters of the drop such as the surface tension, the viscosity or the size of the drop, and which is around a few hundreds of hertz. Thus the frequency is, preferably, between 100 Hz and 10 kHz, preferably around 1 kHz.

Thus the response of the liquid $F_1$ depends on the effective level of the voltage applied since the contact angle depends on the voltage in $U^2$, according to the well-known equation of electrowetting on dielectric (see e.g. Berge, 1993, "Electrocapillarité et mouillage de films isolants par l'eau", C.R. Acad. Sci., 317, série 2, 157-163). The effective value may vary between 0V and a few hundreds of volts, for example 200V. It is preferably around a few tens of volts.

A dielectric layer 34 and a hydrophobic layer (not shown) directly cover the electrode 31. A single layer combining these two functions may be suitable, for example a layer of Parylene.

The hydrophobic character of the layer means that a liquid/fluid interface placed on this layer has a contact angle greater than 90°.

The length of the electrode 31 in the longitudinal direction of the microchannel 10 defines a control portion 16. The interface $I_1$ is situated in the control portion 16.

The microchannel has a length of between 100 μm and 500 μm, preferably between 300 μm and 100 μm.

The height or diameter of the microchannel is typically between 10 μm and 200 μm, and preferably between 20 μm and 100 μm.

The reservoir may have a capacity of between 1 μl and 1 ml.

The substrate 20 may be made from silicon or glass, or plexiglas. In the case of a conductive or semiconductive substrate, such as silicon, its surface is preferably oxidised, for example by thermal oxidation, or covered with a thin dielectric layer, such as $Si_3N_4$, with a thickness of a few microns.

The electrode 31 is obtained by the deposition of a fine layer of a metal chosen from Au, Al, ITO, Pt, Cu, Cr etc or an Al—Si etc alloy by virtue of conventional microelectronics microtechnologies.

The thickness of the electrode is between 10 nm and 1 μm, preferably 300 nm. The length of the electrode 30 is from a few micrometers to a few millimetres.

The electrode 31 is covered with a dielectric layer 34 of $Si_3N_4$, $SiO_2$ etc, with a thickness of between 300 nm and 3 μm, preferably 1 μm. The $SiO_2$ dielectric layer can be obtained by thermal oxidation.

Finally, a hydrophobic layer is deposited on the dielectric layer 34 and the wall of the microchannel 10. For this purpose, a deposition of Teflon effected by spinner or SiOC deposited by plasma can be carried out. A deposition of hydrophobic silane in vapour or liquid phase can be carried out.

The counter-electrode 32 is produced in a similar fashion to the electrode 31 when it is disposed on a face of the microchannel 10. Where the counter-electrode takes the form of a catenary wire, it is simply fixed when the steps described above are performed.

According to the first embodiment of the invention, a control system is provided for controlling the movement of the liquid $F_1$ according to the position of the interface $I_1$.

The control system comprises a capacitive measuring device for determining the position of the interface $I_1$ and controlling the movement of the liquid $F_1$.

In the first embodiment, the capacitive measuring device is connected to the electrode 31 and to the counter-electrode 32.

It comprises a voltage source 43 connected to the voltage source 33 for adding to the alternating voltage generated by the voltage source 33 an alternative component with different frequency and amplitude. Preferably, the frequency is around ten times higher, and the amplitude at least ten times smaller, than those of the voltage of the voltage source 33. For example, if the frequency of the voltage source 33 is 1 kHz, the frequency of the voltage source 43 will preferentially be a few tens of kilohertz. The amplitude of the voltage delivered by the voltage source 43 will preferably be around a few volts if the amplitude of the voltage delivered by the source 33 is a few hundreds of volts.

For the purpose of measuring the capacitance formed between the biased liquid $F_1$ and the electrode 31, a capacitor 46B is put in series with the electrode 32 in order to form a capacitive divider.

The capacitance 46B can be between 10 pF and 500 pF, and is preferably 100 pF.

A voltmeter 46A measures the voltage at the terminals of the capacitor 46B.

Moreover, it is possible to replace the capacitor 46B and voltmeter 46A with an impedance analyser.

The voltage measured is transmitted to means 47 of calculating the position of the interface $I_1$.

From the voltage measured, the calculation means 47 calculate the capacitance formed between the biased liquid $F_1$ and the electrode 31 and deduce therefrom the rate of coverage of the dielectric layer 34 by the liquid $F_1$. From the rate of coverage and knowing the position of the dielectric layer 34, the calculation means 46 determine the position of the interface $I_1$ in the microchannel 10.

The position of the interface $I_1$ is next transmitted to control means 52. These are connected to the voltage source 33 and make it possible to vary the voltage generated.

The variation in the voltage generated by the voltage source 33 makes it possible to control in particular the speed of movement of the liquid $F_1$.

The calculation means 47 and the control means 52 are for example disposed on a printed circuit (not shown).

Thus the control system makes it possible to control the movement of the liquid $F_1$ according to the position of the interface $I_1$ detected by capacitive measurement.

The functioning of the device for the controlled movement of liquid according to the first embodiment of the invention is as follows.

The voltage source 33 activates the electrode 31 and allows movement of the liquid $F_1$.

The activation of the voltage source 43 makes it possible to measure the capacitance formed between the biased liquid $F_1$ and the electrode 31. For this purpose, the voltmeter 46A measures the voltage at the terminals of the capacitor 46B and sends the signal measured to the calculation means 47.

The means 47 of calculating the position of the interface $I_1$ make it possible to obtain from the measured voltage the rate of coverage of the dielectric layer 34 by the liquid $F_1$ and deduce therefrom the position of the interface $I_1$. The position of the interface $I_1$ is transmitted to the control means 52.

According to the signal received, the control means 52 determine the potential difference to be applied by the voltage source 33 in order to make the interface $I_1$ reach a given position.

According to the potential difference applied by the voltage source 33, a greater or lesser electrowetting force is generated at the interface $I_1$. Its magnitude makes it possible to control in particular the speed of movement of the liquid $F_1$.

The electrowetting force thus causes the movement of the liquid $F_1$ in the direction X, which "pushes" the fluid $F_2$ in the same direction.

Figure 3:
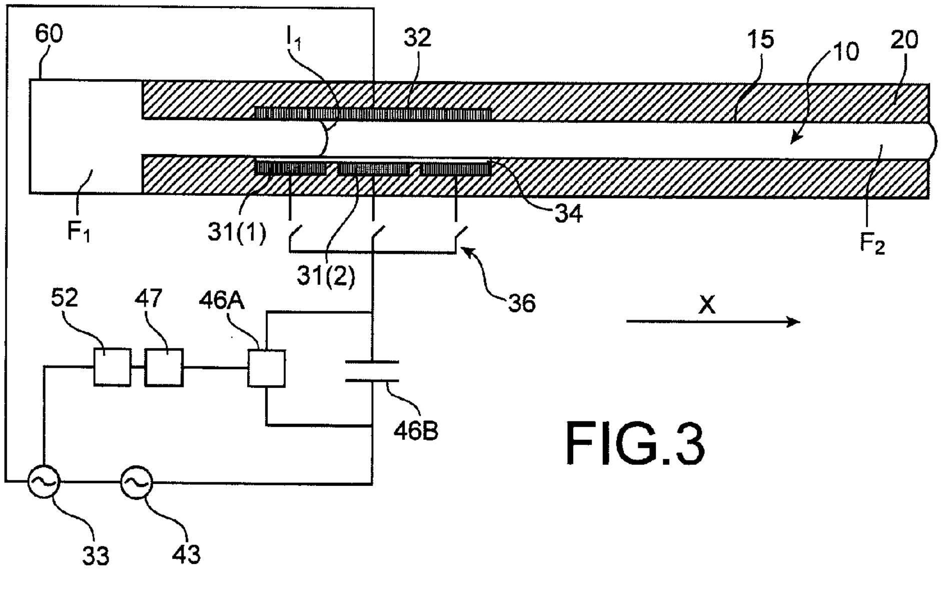
FIG. 3 is a schematic representation in longitudinal section of a device for the controlled movement of liquid according to an alternative to the first embodiment of the invention.

FIG. 3 shows a variant of the first embodiment of the invention.

A matrix of electrodes 31(1), 31(2) . . . is disposed on one face of the microchannel 10.

The counter-electrode 32 is here an electrode formed on part of the internal wall 15 of the microchannel 10 opposite the matrix of electrodes 31. It may however be a catenary wire (FIG. 2) or be directly disposed on the substrate.

Switching means 36 are provided for activating an electrode 31(*i*) of the matrix of electrodes 31. Closure thereof establishes contact between the electrode 31(*i*) and the voltage sources 33 and 34. The switching means 36 are controlled by an activation pilot (not shown) controlled by the control means 52.

When the electrode 31(*i*) situated close to the interface $I_1$ is activated, by the switching means 36, the dielectric layer 34 between this activated electrode and the liquid under tension acts as a capacitor.

The liquid $F_1$ can be moved gradually, over the hydrophobic surface, by successive activation of the electrodes 31(1), 31(2), etc.

Advantageously, the substrate 20, in the case where it is slightly conductive, for example made from silicon, is taken to a given potential. For example, it may be grounded.

For this purpose, an electrode (not shown) in the form of a metal layer can advantageously be formed on the external wall of the substrate 20 facing the matrix of electrodes 31. It can extend over the entire length of the matrix of electrodes 31.

Taking the substrate 20 to a given potential makes it possible to avoid electrostatic disturbance between the electrodes 31 of the matrix that could interfere with the capacitance measuring signal. Measurement of the capacitance is then more precise, which improves the general precision of operation of the control system.

Figure 4:
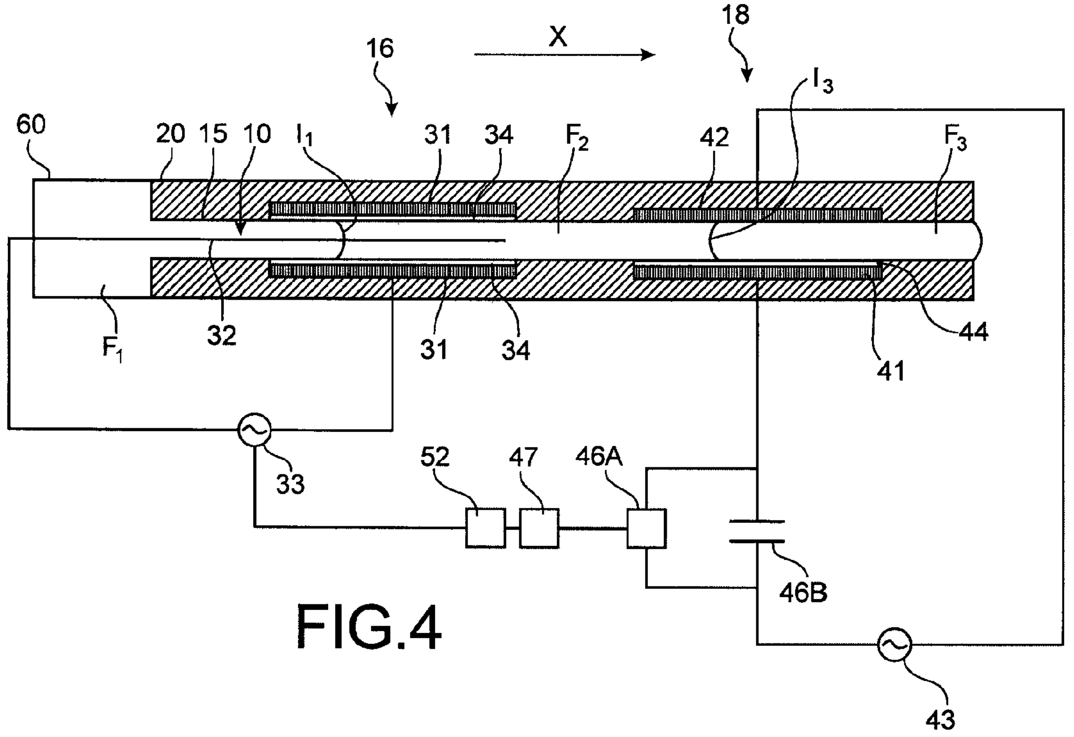
FIG. 4 is a schematic representation in longitudinal section of a device for the controlled movement of liquid according to a second embodiment of the invention, for the which the detected interface is different from that subjected to the electrowetting forces.
Figure 5:
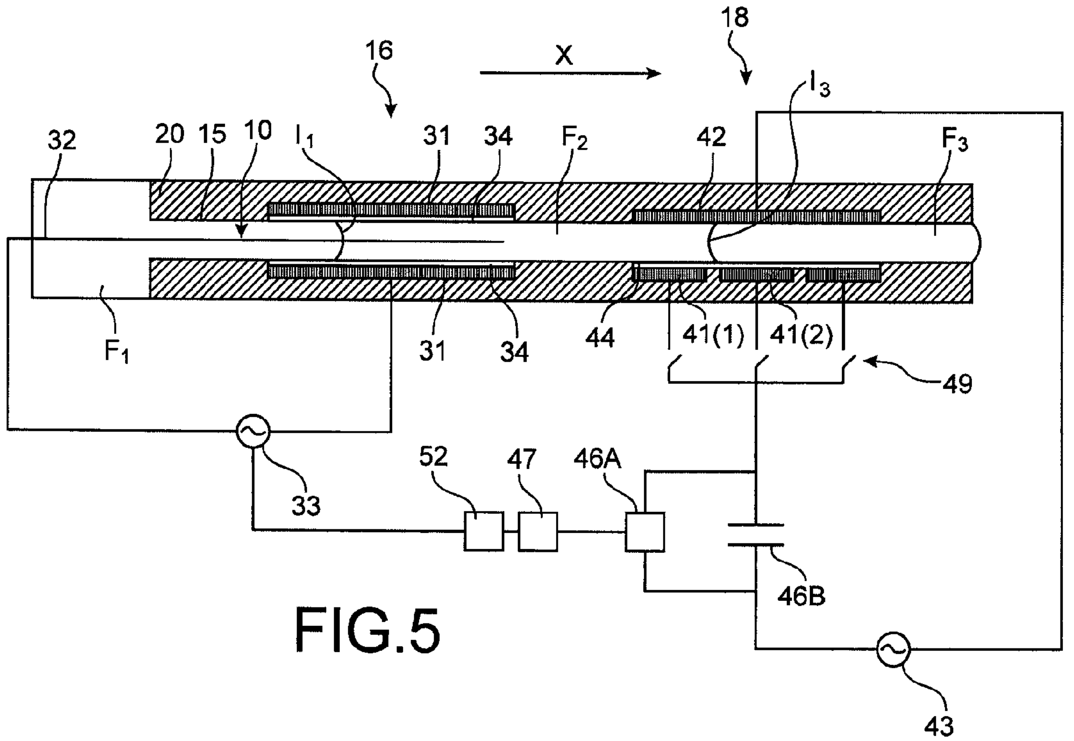
FIG. 5 is a schematic representation in longitudinal section of a device for the controlled movement of liquid according to an alternative to the second embodiment of the invention.
Figure 6:
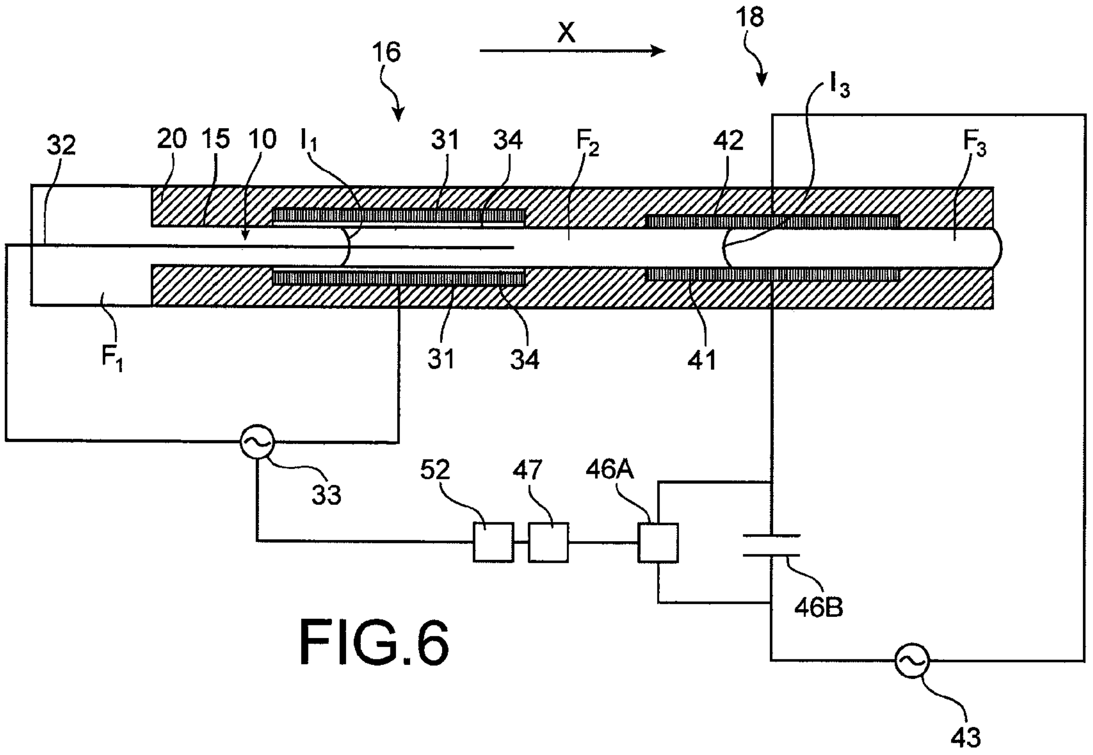
FIG. 6 is a schematic representation in longitudinal section of a device for the controlled movement of liquid according to another alternative to the second embodiment of the invention.

FIGS. 4 to 6 are schematic representations in longitudinal section of a device for the controlled movement of liquid according to a second embodiment of the invention, for which the interface detected is different from that subjected to the electrowetting forces.

According to this embodiment of the invention, the control system is adapted to control the movement of the liquid $F_1$ according to the position of an interface $I_3$.

The microchannel 10 comprises a second liquid $F_3$ that may be electrically conductive or dielectric. It partially fills the channel in the longitudinal direction of the microchannel 10 and forms with the fluid $F_2$ an interface $I_3$.

Thus the liquids $F_1$ and $F_3$ are separated from each other by the fluid $F_2$. The fluid $F_2$ is non-miscible with the liquid $F_3$.

The triple line of the interface $I_3$ is contained in a plane substantially transverse to the microchannel 10.

In the same way as in the first embodiment, the movement of the liquid $F_1$ is obtained by the activation of the electrode 31 connected to a voltage source 33.

The capacitive measuring device of the control system comprises at least one detection electrode 41 formed on the internal wall 15 of the microchannel 10 and extends in the longitudinal direction of the microchannel 10. It is said to be buried and extends over part or all of the perimeter of the microchannel 10.

The length of the electrode 41 defines a detection portion 18. The interface $I_3$ is situated in the detection portion 18.

The detection counter-electrode 42 is formed on the internal wall 15 of the microchannel 10 opposite the electrode 41. The counter-electrode 42 can also be directly disposed on the surface of the microchannel or be disposed in the microchannel 10 in the form of a catenary wire, for example a wire made from Au.

The counter-electrode 42 preferably extends in the microchannel 10 opposite the electrode 41.

The voltage source 43 is connected to the electrodes 41 and 42 in order to apply an alternating voltage according to the same characteristics described above. The mean value of the voltage is zero and the voltage is low, for example one tenth of the voltage generated by 33.

FIGS. 4 and 5 show a device according to the invention for which the liquid $F_3$ is electrically conductive.

With reference to FIG. 4, the capacitive measuring device also comprises a dielectric layer 44 that directly covers the electrode 41.

When the voltage source 43 is activated, the dielectric layer 44 between the electrode 41 and the liquid under tension $F_3$ acts as a capacitor.

The capacitance of this capacitor can be deduced from the voltage measured at the terminals of a reference capacitor 46B connected in series to the electrode 41.

The calculation means 47 make it possible to determine the position of the interface $I_3$, from the voltage measurement by the voltmeter 46A at the terminals of the capacitor 46B.

The control means 52 control the level of the voltage generated by the voltage source 33 according to the position of the interface $I_3$.

Thus the control system makes it possible to control the movement of the liquid $F_1$ according to the position of the interface $I_3$ determined by capacitive measurement.

With reference to FIG. 5, the electrode 41 can be replaced by a matrix of electrodes 41. Switching means 49 can be provided for activating the electrode 41(*i*) at which the interface $I_3$ is situated. Their closure establishes contact between the corresponding electrode 41(*i*) and the voltage source 43. The switching means 49 are controlled by an activation pilot (not shown).

Advantageously, as described previously, the substrate 20, where it is slightly conductive, for example made from silicon, is taken to a given potential. For example, it may be grounded.

For this purpose, an electrode (not shown) in the form of a metal layer can advantageously be formed on the external wall of the substrate 20 opposite the matrix of electrodes 41. It can extend over the entire length of the matrix of electrodes 41.

FIG. 6 shows a device according to the invention for which the liquid $F_3$ is dielectric and has a permittivity different from that of the fluid $F_2$.

The dielectric layer 44 is then no longer necessary. When the voltage source 43 is activated, the fluid $F_2$ and the liquid $F_3$ form two parallel capacitors between the electrode 41 and the counter-electrode 42. The equivalent capacitance varies according to the position of the interface $I_3$ between these electrodes.

The level of this equivalent capacitance can be deduced from the voltage measured at the terminals of a reference capacitor 46B connected in series to the electrode 41.

The components of the control system and the functioning remain identical to what was described previously.

In a supplementary embodiment of the invention, not shown, the control system can also be adapted to detect both the position of the interface $I_1$ and that of the interface $I_3$, for the purpose of obtaining greater precision on the quantity of liquid $F_3$ moved. This situation is particularly suitable in the case where the fluid $F_2$ has a compressibility that it is important to evaluate in real time, or when the liquids $F_1$ and $F_3$ have an uncontrolled evaporation.

The invention claimed is:

1. Device for the controlled movement of liquid, comprising a substrate (20) in which a microchannel (10) is formed, said device comprising:

a first electrically conductive liquid ($F_1$) partially filling the microchannel (10) in the longitudinal direction of the microchannel (10), a dielectric fluid ($F_2$) located downstream of said first liquid ($F_1$) in the longitudinal direction of the microchannel (10), forming a first interface ($I_1$) with the first liquid ($F_1$), or forming a first interface ($I_1$) with the first liquid ($F_1$) and a second interface ($I_3$) with a second liquid ($F_3$) situated downstream of said fluid ($F_2$), and means of moving the first liquid ($F_1$) by electrowetting, characterised in that the controlled movement device comprises a capacitive measuring device for controlling the movement of the first liquid ($F_1$) according to the capacitance measured, said capacitive measuring device being adapted to determine the position of the first interface ($I_1$) or the second interface ($I_2$).

2. Device for the controlled movement of liquid according to claim 1, characterised in that said means of movement by electrowetting comprise:

at least one control electrode (31) disposed on at least part of the wall of the microchannel (10) defining a control portion (16), and covered with a dielectric layer (34), said first interface ($I_1$) being situated in said control portion (16), an electrically conductive means (32) forming a control counter-electrode, in contact with the first liquid ($F_1$), and a first voltage generator (33) for applying a potential difference between said electrode (31) and said counter-electrode (32), said capacitive measuring device being connected to said first voltage generator (33) in order to vary the potential difference applied according to the capacitance measured.

3. Device for the controlled movement of liquid according to claim 2, characterised in that the capacitive measuring device comprises:

said control electrode (31) forming a detection electrode, said control counter-electrode (32) forming a detection counter-electrode, a second voltage generator (43) for applying a potential difference between said detection electrode (31) and said detection counter-electrode (32), means (46A, 46B) of measuring the capacitance formed between said detection electrode (31) and said detection counter-electrode (32).

4. Device for the controlled movement of liquid according to claim 3, characterised in that the capacitive measuring device comprises calculation means (47), connected to the measuring means (46A, 46B), in order to determine the position of the interface ($I_1$, $I_3$) according to the capacitance measured.

5. Device for the controlled movement of liquid according to claim 4, characterised in that the capacitive measuring device comprises control means (52), connected to the calculation means (47) and to the first voltage generator (33), for controlling the potential difference applied by the latter.

6. Device for the controlled movement of liquid according to claim 2, characterised in that the capacitive measuring device comprises:

at least one detection electrode (41) disposed on at least part of the wall of the microchannel (10) defining a detection portion (18) situated downstream of said control portion (16), said second interface ($I_1$) being situated in said detection portion (18), an electrically conductive means (32) forming a detection counter-electrode, in contact with the second liquid ($F_3$), a second voltage generator (43) for applying a potential difference between said detection electrode (41) and said detection counter-electrode (42), means (46A, 46B) of measuring the capacitance formed between said detection electrode (41) and said detection counter-electrode (42).

7. Device for the controlled movement of liquid according to any one of claims 6, characterised in that, the second liquid ($F_3$) being electrically conductive, a layer of dielectric material (44) covers the detection electrode (41).

8. Device for the controlled movement of liquid according to any one of claims 6, characterised in that the second liquid ($F_3$) is dielectric, the permittivity of which is different from that of the fluid ($F_2$).

9. Device for the controlled movement of liquid according to any one of claims 3, characterised in that the measuring means (46A, 46B) comprise a capacitor (46B) connected in series with the detection electrode (31, 41), and a voltmeter (46A) for measuring the voltage at the terminals of said capacitor (46B).

10. Device for the controlled movement of liquid according to any one of claims 3, characterised in that the measuring means (46A, 46B) comprise an impedance analyser.

11. Device for the controlled movement of liquid according to any one of claims 3, characterised in that said detection electrode comprises a plurality of elementary detection electrodes (31, 41).

12. Device for the controlled movement of liquid according to claim 11, characterised in that said substrate (20) is taken to a given potential by an electrically conductive means.

13. Device for the controlled movement of liquid according to claim 12, characterised in that the said means taking the substrate (20) to a given potential comprises an electrode disposed on an external face of the substrate (20) and extending over the entire length of the detection electrode (31, 41).

* * * * *